Dec. 25, 1934. W. M. THOMAS 1,985,471
ATTACHMENT FOR PROJECTING APPARATUS
Filed Dec. 5, 1933 2 Sheets-Sheet 1
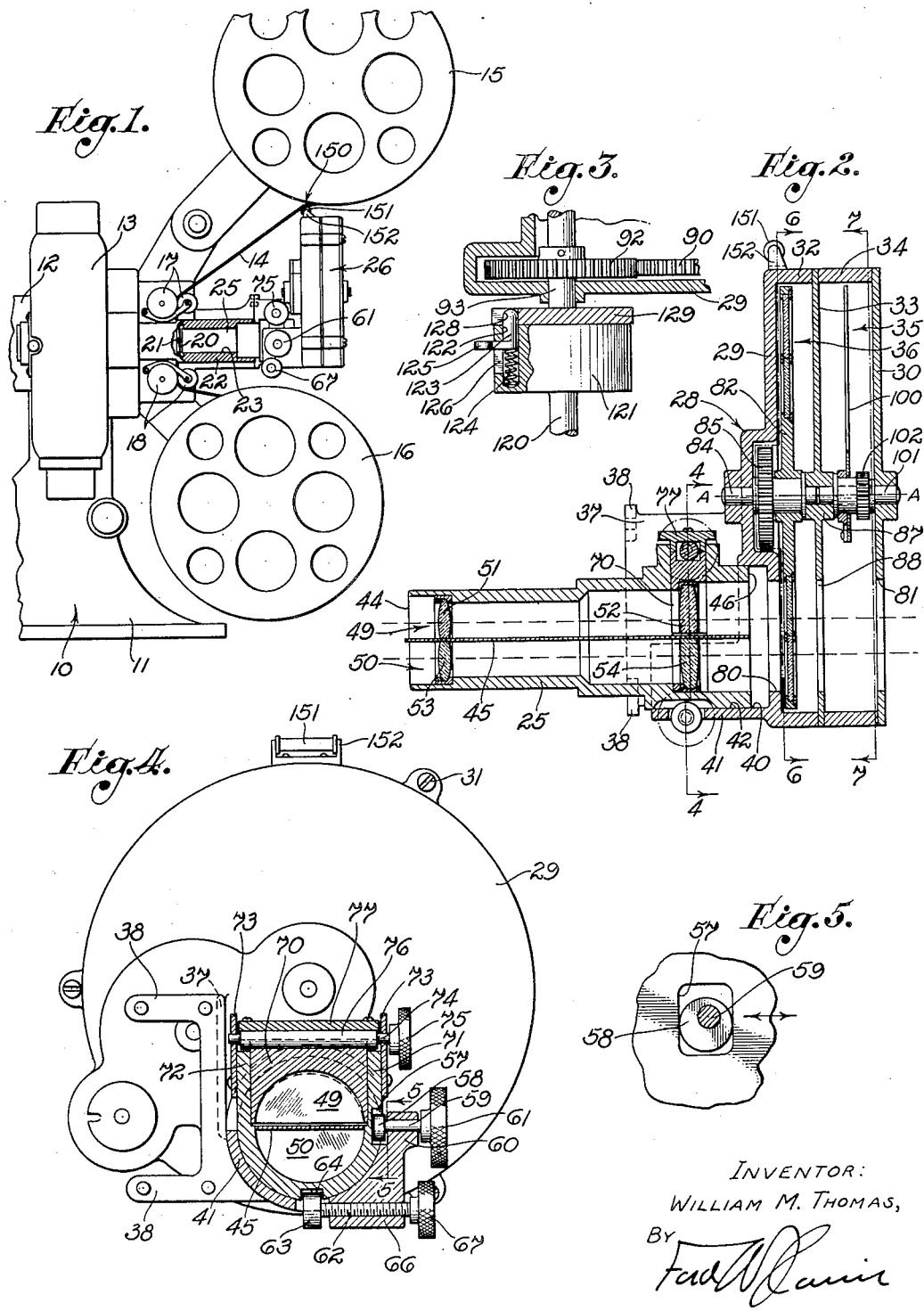
INVENTOR:
WILLIAM M. THOMAS,
BY
ATTORNEY.

Dec. 25, 1934.   W. M. THOMAS   1,985,471
ATTACHMENT FOR PROJECTING APPARATUS
Filed Dec. 5, 1933   2 Sheets-Sheet 2
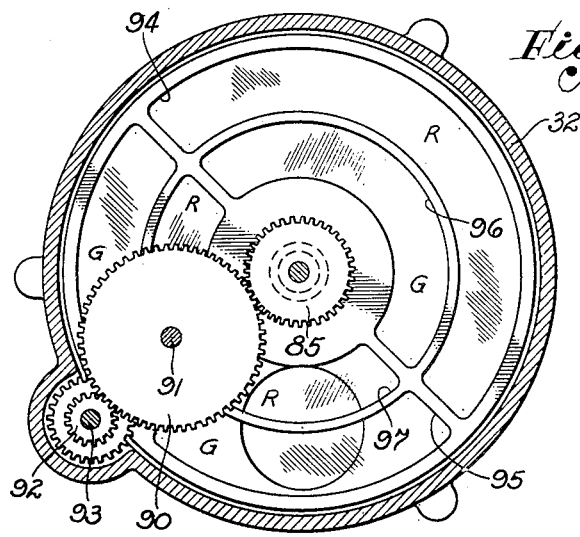
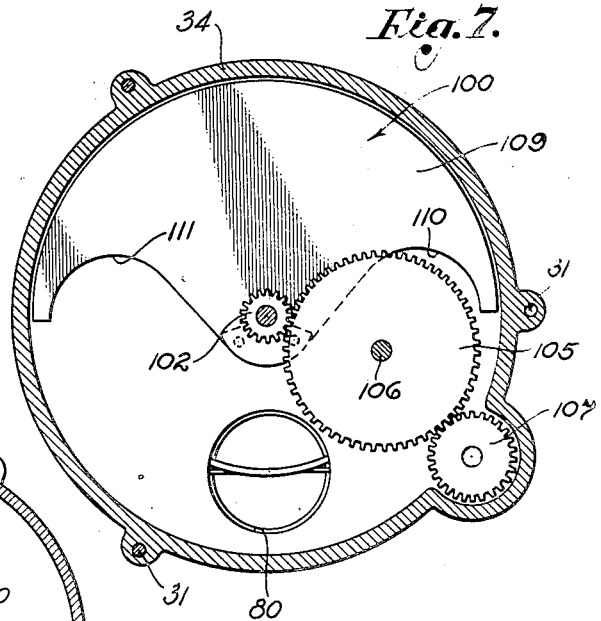
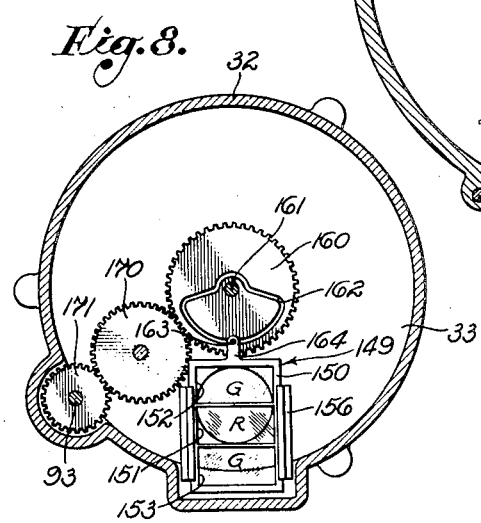
INVENTOR:
WILLIAM M. THOMAS,
By Fad A Lauin
ATTORNEY.

Patented Dec. 25, 1934

1,985,471

UNITED STATES PATENT OFFICE 1,985,471

ATTACHMENT FOR PROJECTING APPARATUS

William M. Thomas, Los Angeles, Calif.

Application December 5, 1933, Serial No. 700,965

18 Claims. (Cl. 88—16.4)

My invention relates to a novel attachment for photographic apparatus and to novel structures which find utility regardless of whether or not they are included in an attachment or directly embodied in a projector or camera. In the preferred embodiment the attachment to be hereinafter described is particularly adapted for use in conjunction with a commercially available motion picture projector and will make possible the projection of colored motion pictures without alteration of the design of such a projector.

In the additive method of color projection, adjacent images on the motion picture film are exposed through two or more filters. Subsequently light beams are passed through the color-value images thus formed, and filters are positioned in these light beams, these filters substantially corresponding in color to those utilized in exposing the color-value images. By properly focusing and bringing into registration the constituent images on a screen, a resulting image, hereinafter termed a "composite" image, is formed, the colors of the two constituent images blending so that the composite image is colored. In the system to be hereinafter described filters of only two colors are utilized, usualy red and green, though it will be clear that the invention is not limited to this number.

It is an object of the present invention to provide an attachment for projector apparatus, adapting this apparatus for use in exposing or projecting colored motion pictures.

It is a further object of the invention to provide an attachment which can be readily attached to or disconnected from a commercial projector apparatus as a unit.

In this connection I have devised an attachment including a lens-enclosing barrel which extends rearwardly through an aperture of the projector apparatus and into a position close to the motion picture film which is moving therethrough, and it is an object of the invention to provide such a structure.

It is a further object of the invention to provide such a lens-enclosing barrel which surrounds two lens systems, each including one or more lens elements, the lens elements of the two systems being positioned edge-to-edge, and to provide a septum means for separating the beams of light moving through these lens systems, this septum means in the preferred embodiment extending rearwardly to a position close to the film.

It is a further object of the invention to provide an attachment for a projector including a novel means for focusing the lens means.

In bringing the images into correct lateral or horizontal registration on the screen, I have found it desirable to be able to shift these images sidewise with respect to each other, and the present invention includes a novel means for thus shifting the images, this means including a novel structure for slightly turning the lens-enclosing barrel so that the lens elements move sidewise with respect to the film images.

It is a further object of the invention to provide a novel adjustment means for changing the longitudinal or vertical registration of the images, this structure including a novel lens-mounting member for at least one of the lens elements to permit this lens element to move sidewise with respect to its adjacent lens element.

Further objects of the invention lie in the provision of a novel shutter and in the novel mounting for the shutter and a filter-supporting structure.

Still a further object of the invention is to provide a novel shifting device operatively connecting the color-filter support to the film-advancing mechanism so that actuation of this device permits a shifting of the color filters into proper registration with the images being projected.

A further object of the invention lies in a novel attachment for projection apparatus which includes a guide means for the film which enters or leaves this apparatus.

Other objects of the invention lie in the novel structural details herein disclosed regardless of whether or not these details are used in an attachment or whether or not these details are designed into a projector or camera as it is being manufactured.

Still further objects and advantages of the invention will be made evident hereinafter.

In the drawings I have, for illustrative purposes, shown a type of attachment which is particularly adapted for use with one type of commercially available projector. Only slight modifications are necessary to adapt the attachment to other types of projectors, and it will be understood that I am not limited to the embodiment selected for illustrative purposes nor to the shape or particular design of the elements shown.

Referring to the drawings, in which this embodiment is illustrated,

Fig. 1 is a side view of a commercial 16 mm. projector with the attachment of my invention in place.

Fig. 2 is a vertical sectional view of the preferred embodiment of attachment.

Fig. 3 is a view illustrating the connecting means of the invention, this means operatively connecting the mechanism of the projector and attachment.

Fig. 4 is a sectional view taken on the line 4—4 of Fig. 2.

Fig. 5 is a sectional view taken on the line 5—5 of Fig. 4 and illustrates the cam utilized to effect focusing movement.

Fig. 6 is a sectional view taken as indicated by the line 6—6 of Fig. 2 and shows in detail one form of filter-supporting means.

Fig. 7 is a view of the preferred embodiment of shutter and is taken as indicated by the line 7—7 of Fig. 2.

Fig. 8 illustrates an alternative form of color-filter support.

Referring particularly to Fig. 1, a well known type of projector is indicated by the numeral 10 and includes a base 11 supporting a motor 12 and a lamp housing 13. This motor is operatively connected to a film-advancing means, not shown in detail, for moving a film 14 from a reel 15 to a reel 16 or vice versa, this film passing between pairs of rollers 17 and 18 in the usual manner. In commercially available projectors this film moves vertically in a space between a film gate and an aperture plate. In adapting the projector for use with the attachment to be hereinafter described, it is desirable to substitute for this aperture plate a plate 20 having two apertures which may be separated by a small wall 21, these apertures and the wall 21 being so designed that the apertures cover adjacent frames on the film 14. Thus, the light source 13, either with or without modification, can be made to project beams of light through the two apertures of the plate 20 and through two color-value images appearing in adjacent position on the film 14.

The projector 10 includes a forward extending member 22 which normally contains a single lens system. When using the attachment to be hereinafter described, this lens system is removed, so that an aperture 23 of the forwardly extending member 22 may receive a mounting member or barrel 25 forming a part of the attachment of my invention indicated in general by the numeral 26.

The attachment 26 also includes an enclosing structure indicated in general by the numeral 28 and defines a rear wall 29 and a front wall 30 spaced from each other by screws 31 (see Fig. 4). Suitable spacer means may be used to separate the front and rear walls 30 and 29, but in the form shown I have illustrated the rear wall 29 as including a flange 32, the forward end of which engages a partition 33, this partition also contacting a shell 34 extending forward to engage the front wall 30. With this construction the screws 31 extend between the front wall 30 and the rear wall 29 and clamp the structure together, thus forming a shutter chamber 35 and a filter chamber 36.

Any suitable means may be used for mounting the enclosing structure 28 with respect to the projector 10. In the embodiment shown I have illustrated a bracket structure cast integrally with the rear wall 29 or suitably connected thereto, this bracket including a plate 37 bent to form arms 38 provided with openings through which bolts may extend, these bolts threading into any suitable portion of the projector. The attachment is thus detachably connected to the projector or other photographic apparatus and can be easily removed should it be desired to use the projector in the conventional manner.

As shown in Figs. 2 and 4, the rear wall 29 provides a socket 40 in which the forward end of the mounting member or barrel 25 extends. A channel member 41 extends rearward from the rear wall 29 and provides an arcuate channel 42 which is in alignment with the socket 40. The mounting member or barrel 25 is thus operatively mounted in the channel 42 and in the socket 40.

The mounting member or barrel 25 is so disposed as to extend rearward in the passage 23 and terminate in a rear edge 44 which lies close to the aperture plate 20. This mounting member or barrel 25 serves to retain any suitable lens structure. When the attachment is used for projecting colored motion pictures, I prefer to divide the interior of this mounting member or barrel 25 by suitably mounting therein a septum means 45 composed of one or more members and preferably extending from a front wall 46 of the mounting member or barrel 25 to the rear edge 44 thereof or slightly therebeyond. The end in view is to bring the rear portion of the septum means 45 into close proximity to the wall 21 of the aperture plate 20.

Lens systems 49 and 50 are positioned in the mounting member or barrel 25 respectively above and below the septum means 45, these lens systems respectively lying in front of the apertures of the aperture plate 20, and thus respectively lying in front of the adjacent color-value images on the film 14. In the embodiment shown I have diagrammatically illustrated the lens system 49 as composed of lens elements 51 and 52, while the lens system 50 is composed of lens elements 53 and 54. It should not be understood that I am limited to the use of lens systems including a plurality of lens elements nor to the particular number of lens elements disclosed. Various combinations of lens elements capable of forming satisfactory screen images are known in the art, the showing of Fig. 2 being only diagrammatic. Usually, however, it is desirable to form the lens elements as disclosed in my copending application. Serial No. 698,998, filed November 21, 1933, with the end in view of spacing the optical axes of the lens systems 49 and 50 a distance from each other which is substantially equal to the center-to-center spacing of the color-value images on the adjacent frames of the film 14. As disclosed in my application supra, this may readily be accomplished by removing the adjacent edges of the lens elements 51 and 53, and by removing the adjacent edges of the lens elements 52 and 54. Such a structure permits the optical axes of the lens systems 49 and 50 to be brought close together. The result is that the beams of light which respectively pass through the apertures of the aperture plate 20 can move forward in substantially parallel relationship through the lens systems 49 and 50. So also, following the teachings set forth in my application supra, it is usually desirable to grind away the outermost edge of each lens element, in this instance the upper edges of the elements 51 and 52 and the lowermost edges of the elements 53 and 54. Such a structure eliminates flicker which would otherwise take place due to the light rays passing through the extreme upper and lower edges of the lens elements.

In order that the images may be properly focused on a screen, it is desirable to provide a focusing means for simultaneously moving the lens systems 49 and 50 toward and away from the film. In the embodiment shown this is accomplished by moving the mounting member or barrel 25 in a forward-rearward direction, the forward end of this barrel sliding in the socket 40. This movement may be effected by any desirable means. In the form shown the mechanism for accomplishing this result includes a vertically extending slot 57 formed in the peripheral wall of the mounting member or barrel 25, as best illustrated in Figs. 4 and 5. Positioned in this slot is a cam 58 in the form of a disc mounted eccentric with respect to a shaft 59, this shaft being suitably journalled in a boss 60 of the channel member 41. A knurled wheel 61 may be connected to the shaft 59. Thus, when the knurled wheel 61 is turned, the cam 58 moves the mounting member or barrel 25 in a forward-rearward direction with respect to the enclosing structure 28, thus changing the focus of the lens structure.

In order that the constituent screen images be brought into correct lateral or horizontal registration, it is desirable to be able to move one of the lens systems sidewise with respect to the other. This may be accomplished by slightly turning the mounting member or barrel 25 relative to the film and relative to the enclosing structure 28. Any suitable means may be utilized for accomplishing this movement. In the form shown this movement is effected by the use of an advancing member 62 which carries a wheel 63. The peripheral portion of this wheel extends into a channel 64 formed in the mounting member or barrel 25 so that if the advancing member 62 is moved axially, the wheel 63 engages the side walls of the channel 64 to slightly turn the mounting member or barrel 25. I prefer to secure this axial movement of the advancing member 62 by threading this member with respect to a ledge 66 of the channel member 41, in which event the advancing member 62 is pivotally connected to the wheel 63. A knurled wheel 67 may be utilized for turning the advancing member 62, thus slightly turning the lens systems 49 and 50. The amount of this turning movement of the lens systems is relatively small.

In some instances it is possible to mount all of the elements 51 to 54 in the mounting member or barrel 25 in fixed relationship. However, when it is desired to focus on screens at various distances from the projector, it is very desirable to be able to change the longitudinal or vertical registration of the images. As disclosed in my copending application Ser. No. 698,997, filed November 21, 1933, this can be accomplished by simultaneously moving certain of the lens elements toward and away from each other, for instance the lens elements 52 and 54. In the embodiment herein shown, however, I illustrate a simplified structure in which only one lens element is moved in a sidewise direction to effect this vertical or longitudinal registration of the screen images.

Thus, in Fig. 2 I have shown the lens element 52 as being mounted in a lens-supporting member 70. The mounting member or barrel 25 may be provided with vertically extending arms 71 and 72 for guiding this lens-supporting member 70 in its vertical movement. Plates 73 are secured to these arms and journal a shaft 74 to which is connected a knurled wheel 75. A cam 76 is also carried by the shaft 74 and operatively engages the upper end of the lens-supporting member 70. This member 70 also carries a cap member 77 suitably secured thereto, the cam 76 engaging the lower surface of this cap member. Thus, when the knurled wheel 75 is turned, the cam 76 moves the lens-supporting member 70 vertically due to the engagement between this cam and the members 70 and 77. This movement may move the lens element 52 slightly away from the septum 45, but I have found that the required degree of movement of this lens element is so small that the minute separation between this lens element and the septum means will introduce no distortion into the screen images.

To permit the light rays to pass through the lens systems 49 and 50, two aligned openings 80 and 81 are respectively formed in the rear and front walls 29 and 30. In effect these rays form two beams respectively passing through the lens systems, and when the attachment is used for the projection of colored images it is desirable to provide color filters for intercepting these beams. Thus, in Figs. 2 and 6 I have illustrated a color-filter support 82 in the chamber 36 and rotatable about an axis A—A which preferably lies in substantially the same plane as do the optical axes of the lens systems 49 and 50. In the preferred embodiment this color-filter support is pivoted relative to the rear wall 29, this being accomplished by a pin 84 retained therein and pivotally mounting a pinion 85 to which the color-filter support 82 is secured. If desired, the forward end of the pin 84 can be retained in a boss 87 of the partition 33, though this is not in all instances necessary, it being possible to completely eliminate the partition 33 in some instances. If the partition is used, however, an opening 88 should be formed therein in alignment with the openings 80 and 81. The color-filter support 82 is driven by a gear train, the elements of which are rotatably mounted with respect to the rear wall 29. This gear train includes the pinion 85 and an idler gear 90 pivoted on a shaft 91 secured to the rear wall 29. This train also includes a drive pinion 92 fixed to a driven shaft 93 which lies outside the path of travel of the color-filter support 82, this shaft being driven from the motion picture device in a manner to be hereinafter described.

If the film 14 is advanced one frame at a time, and if adjacent color-value images thereon were respectively exposed through red and green color filters, it is desirable to position corresponding red and green color filters in the color-filter support 82. As shown in Fig. 6, this color-filter support 82 includes outer and inner series of openings. As shown, the outer series of openings includes openings 94 and 95 which respectively carry red and green color filters. Similarly, the inner series of openings includes openings 96 and 97 respectively carrying green and red color filters. Thus, when the color-filter support is disposed as indicated in Fig. 6, a red filter will be interposed in the beam passing through the lens system 49, while a green filter will be interposed in the beam passing through the lens system 50. When, however, the openings 94 and 96 are disposed in the front of the lens systems, the colors of the filters will be reversed. Thus, the color-filter support 82 preferably turns one-half revolution during the time that a given pair of images on the film 14 is being projected. When the film is advanced one frame, the color-filter support 82 reverses the color filters so that the red color-value images previously projected through the lens system 49 and through the red filter in the opening 97 will at this later instant of time be projected through the lower lens system 50 and through a red filter in the opening 94. It should not be understood, however, that I am limited to this sequence. In some instances it is possible to use a double-frame advance for the film 14, in which event it is not necessary to reverse the color filters. In this instance a stationary filter support can be used.

A shutter 100, best shown in Figs. 2 and 7, is positioned in the chamber 35 and is preferably rotatable about the axis A—A. In the form shown this is accomplished by a pin 101 mounted in the front wall 30 and journalling a pinion 102 to which the shutter is connected. If the partition 33 is used, the rear end of the pin 101 may fit into the boss 87 of this partition. A gear train associated with the front wall 30 drives the pinion 102 from the driven shaft 93, this gear train including the pinion 102 and an idler gear 105 rotatably mounted on a pin 106 retained in the front wall 30. This idler gear meshes with a drive pinion 107 mounted on the driven shaft 93.

Various types of shutters may be utilized without departing from the spirit of the invention. In the form shown in Fig. 7 I have illustrated a single-blade shutter including a blade 109 which moves into and from the beams. I have found it very desirable in order to eliminate color beat to design the blade so that an entry edge 110 thereof enters the beams substantially simultaneously, while a trailing edge 111 thereof leaves the beams substantially simultaneously. This may be accomplished by rotating the shutter about the axis A—A lying to one side of the lens systems 49 and 50 and preferably lying in the same plane which includes the optical axes of these lens systems. The entry edge 110 and the trailing edge 111 may be radially disposed, but in the preferred embodiment of the invention they are curved as illustrated in Fig. 7, being in the form of semi-circular channels. As previously mentioned, it is desirable that the entry edge 110 simultaneously enter the beams and that the trailing edge 111 simultaneously leave the beams. The form of shutter in which these edges are curved, as indicated, is particularly valuable in this regard.

In the form shown the shutter preferably rotates at an angular velocity which is four times as great as the angular velocity of the color-filter support 82. Thus, the blade 109 serves not only to intercept the beams during the time that the film is being advanced, but also acts as a flicker blade moving once through the beams during the time that the film is stationary. If the blade 109 is not used as a flicker blade, the speed of rotation of the shutter need be only twice that of the color-filter support 82. The use of the blade 109 as a flicker blade helps to eliminate all apparent flicker on the screen. If desired, the blade 109 may be moved through the beams more than once during the time that the film is stationary.

The gear trains driving the color-filter support 82 and the shutter 100 are designed to give the proper speed to these members when the driven shaft 93 is turned. This driven shaft is preferably connected directly or indirectly to the film-advancing means of the projector or other motion picture device. The type of projector illustrated in Fig. 1 includes a shaft 120 (see Fig. 3) which extends from the enclosing structure thereof and is normally adapted to synchronize the sound equipment if talking motion pictures are to be reproduced. To this shaft I attach a head 121 including an off-center passage 122 in which a pin 123 slides. This pin is resiliently forced in a forward direction due to the action of a spring 124, and a manually operable tab 125 is preferably secured to the pin 123, extending outward through a slot 126 so that the pin may be manually retracted. When in an advanced position this pin fits into an off-center opening 128 in a plate 129 secured to the driven shaft 93.

This structure has several advantages. In the first place, it permits automatic connection between the mechanisms of the projector and the attachment when the attachment is secured in place. This eliminates all flexible torque-transmitting devices for interconnecting these structures, and eliminates any belts, chains, or exposed gears for accomplishing this result. In the second place, however, the retractable pin 123 performs an additional function. Thus, it is necessary that the color filters and the shutter be synchronized in proper relationship with the film-advancing means in order to produce correct color effects. If it happens that the operator inserts the film in such a manner that the color-value images are reversed with respect to the position of the filters, or if the film has been improperly spliced, the defect in color is readily apparent. To correct this the operator need only momentarily draw the tab 125 rearward, thus momentarily removing the retractable pin 123 from the opening 128. The head 121 will then make one revolution, at which time the pin will automatically slip into the opening 128. This allows a relative shifting between the drive shaft 120 and the driven shaft 93 and thus corrects the relationship between the film-advancing means and the color filters. This operation can be performed while the projector is in operation. If desired, a plurality of openings 128 may be disposed in the plate 129 so that the angle of shift between the shafts 120 and 93 will be less. Usually, however, only one opening is necessary.

Another feature of the attachment lies in the guide means retained on the upper end thereof for guiding the film 14. This means is best illustrated in Fig. 1 and indicated by the numeral 150 and preferably includes a roller 151 suitably journalled in a bracket 152 carried by the enclosing structure 28, the roller 151 being so positioned as to engage the film as it moves into or from the reel 15. This prevents any sliding contact between the film and the enclosing structure 28.

Various types of color-filter supports can be used. One alternative form is diagrammatically illustrated in Fig. 8 taken at a section corresponding to the line 6—6 of Fig. 2. This form of filter support 149 may include a reciprocating frame 150 which in one embodiment may have four apertures, the central apertures carrying filters of the same color and the end apertures carrying filters of a different color. In the embodiment shown in Fig. 8 only a single central aperture 151 is used which carries, for instance, a red color filter. The end apertures 152 and 153 then carry green color filters. If the filter support is disposed as shown, a green filter is disposed in front of the lens system 49, while a red filter is disposed in front of the lens system 50. When the film advances one frame, these color filters must be reversed. The reciprocating frame 150 may slide between guides 156 and may be reciprocated in step with the film by any suitable means. As shown, this means may include a cam wheel 160 rotatably mounted on a pin 161 and carrying a cam groove 162 receiving a pin 163 secured to an arm 164 of the frame 150. The cam wheel 160 may be driven by an idler 170 also meshing with a pinion 171 on the shaft 93, this gear train and the cam groove 162 being so designed that the frame quickly shifts from one extreme position to the other each time that the film is advanced. Other equivalent shifting means may be used, the form shown in Fig. 8 being merely illustrative.

If sound equipment is to be used in conjunction with the projector, this equipment can be operatively connected to the driven shaft 93. For this purpose this shaft may be extended completely through the enclosing structure 28 and slightly forward from the front wall 30.

It will be clear that various modifications may be made without departing from the spirit of the invention, and the claims hereunto annexed are not limited to the embodiment herein disclosed in detail.

Many of the features herein shown can be designed directly into a camera or projector rather than being made a part of an attachment so that I am not limited in all instances to these features in conjunction with an attachment. So also, equivalents of the elements herein disclosed may be used.

I claim as my invention:

1. In an attachment for a motion picture projector with a front wall having an aperture for receiving a lens holder, and a film gate to the rear of said aperture, the combination of an enclosing structure for a color screen detachably connected to said projector, a barrel extending rearwardly therefrom adapted to be fitted into said aperture to a position close to said film gate, a pair of lens elements positioned edge to edge in said barrel, and a septum means in said barrel extending between said lens elements and rearwardly therefrom to a position adjacent said film gate.

2. An attachment as described in claim 1 wherein means is provided for adjusting said barrel in forward and rearward directions with respect to said enclosing structure to focus the lens elements therein.

3. In an attachment for a motion picture projector equipped with a front wall having an aperture for receiving a lens holder, a film gate to the rear of said aperture, and film advancing means, the combination of an enclosing structure for a color screen and shutter detachably connected to said projector, a barrel borne by said enclosing structure and extending rearwardly into said aperture, a lens unit in said barrel, a shutter and a color screen journaled within said enclosing structure, said shutter providing a blade movable through the light rays passing through said lens unit, and detachable means operatively connecting said shutter and said film advancing means to drive said shutter in timed relation with the movement of said film advancing means.

4. An attachment for a motion picture projector equipped with a front wall having an aperture for receiving a lens holder, a film gate to the rear of said aperture, and film advancing means, comprising an inclosing structure detachably connected to said projector, a barrel associated with said enclosing structure and extending rearwardly into said aperture, a lens unit in said barrel, a shutter mounted to turn in said enclosing structure and providing a blade movable through the light rays passing through said lens unit, a color filter mounted to turn in said enclosing structure in position to be interposed in said light rays, driving means for said shutter and said color filter, and detachable means operatively connecting said driving means and said film advancing means to move said shutter and said color filter in timed relation with the movement of the film advancing means.

5. An attachment as defined in claim 4 in which the color filter and the shutter are mounted to turn about the same axial line, said axial line lying to one side of the axis of the barrel.

6. An attachment for a motion picture projector equipped with a front wall having an aperture for receiving a lens holder, a film gate to the rear of said aperture, and film advancing means, comprising an enclosing structure having a color screen and shutter, detachably connected to said projector formed with a front wall and a rear wall spaced from each other, said walls having aligned openings to permit the passage of light therethrough, a color filter pivoted to one of said walls and positioned in the space between the walls, a shutter in said space and pivoted to the other of said walls, a barrel extending rearwardly from said enclosing structure in alignment with said openings, and a pair of lens systems in said barrel respectively in front of a pair of frames defined by said film gate, said color filter and said shutter cutting through the light rays passing through said lens systems.

7. In an attachment for a motion picture projector with a front wall having an aperture for receiving a lens holder, a film gate to the rear of said aperture and film advancing means, the combination of an enclosing structure detachably connected to said projector and including a front wall and a rear wall spaced from each other with aligned openings in both walls to permit passage of light, a color filter pivoted to one of said walls and positioned in space between said walls and having a pinion rotating therewith, an idler gear adjacent to one of said walls and meshing with said pinion, a drive pinion meshing with said idler pinion, a shaft driven in timed relation with said film advancing means and carrying said drive pinion, a shutter in said space and pivoted to the other of said walls and including a pinion rotating therewith, a second idler gear adjacent to the other of said walls and meshing with said pinion of the shutter, a second drive pinion on said driven shaft meshing with said second idler gear to drive the shutter, a barrel extending rearwardly from said closing structure and fitting into said aperture, and a pair of lens systems in said barrel respectively in front of the pair of frames defined by said film gate, said color filter and said shutter cutting off light rays passing through said lens systems.

8. In an attachment for a motion picture projector with the front portion thereof having an aperture for receiving a lens holder, a film gate to the rear of said aperture and a film advancing means, the combination of an enclosing structure detachably connected to said projector, a barrel mounted for slidable adjustment with respect to said enclosing structure, said barrel adapted to fit into said aperture, a lens unit in said barrel and a shutter and color filter mounted in said enclosing structure, the enclosing structure having openings in alignment with said barrel to permit passage of light therethrough.

9. An attachment for a motion picture projector with a front wall having a front portion with an aperture for receiving a lens holder, a film gate to the rear of said aperture and film advancing means, comprising an enclosing structure for a shutter and color filter detachably connected to said projector and having a socket therein, a barrel having one end in said socket and having its other end fitting into said aperture, means for adjusting said barrel lengthwise in said socket, and a lens unit in said barrel adapted to be focused by said adjusting movement of said barrel in said socket.

10. An attachment as defined in claim 9 in which the lens unit comprises two lens systems mounted in adjacent relationship with a septum member between, and with means for turning said barrel in said socket, to shift said lens systems sidewise with respect to each other.

11. In an attachment for a motion picture projector with a front portion having an aperture for receiving a lens holder, a film gate and film advancing means, the combination of an enclosing structure detachably connected to said projector defining a space bound by front and rear walls with aligned openings in said walls, a barrel mounted in alignment with said openings having a lens unit mounted therein, a shutter and a color filter mounted in said space and movable to intercept light rays passing through said aligned openings, and a detachable coupling means for operatively connecting said shutter and color filter with said film advancing means.

12. An attachment as set forth in claim 11 wherein the barrel fits adjustably into a socket in the rear wall of the enclosing structure and has means to adjust the same for focusing the lens in said barrel.

13. A device for converting to color motion picture uses a projector having film guiding and advancing means and an aperture at its front receiving a lens holder, said device comprising an attachment unit, embodying a support, having a holder for a lens unit adjustable with respect thereto, said holder adapted to be detachably fitted in said projector aperture to replace the projector lens, said holder mounting a lens unit, a shutter and a color filter mounted on the support in position to intercept the light rays from said lens unit, means for detachably mounting said support on the projector, and means for detachably connecting said film advancing means, and said shutter and color filter for relatively timed operation.

14. An attachment as defined in claim 13 in which the last named means comprises a driven shaft operatively connected to said shutter and to said color filter, and includes connecting means for detachably connecting said shaft to said film advancing means in selective relations so as to bring said shutter and said color filter into correct relation with the film.

15. A device as set forth in claim 13 wherein the holder is mounted for turning movement and has lens elements mounted therein at each side of the axis of such turning movement, an advancing member operatively connected to said holder whereby sidewise movement of said advancing member turns said holder, and means for moving said advancing member in a sidewise direction to turn said holder.

16. A device as set forth in claim 13 wherein the holder is equipped with similar lens elements symmetrically disposed at each side of its axis with means for mounting said holder to turn about such axis, with an advancing means in the form of a wheel operatively engaging said holder whereby a sidewise movement of said wheel turns said holder, and means for moving said wheel sidewise to turn said holder.

17. A device as set forth in claim 13 wherein the holder has similar lens elements symmetrically mounted at each side of its axis, said holder having walls forming a cam slot, a cam mounted in such support and acting against such walls when rotated to advance or retract said holder to change the focus of said lens elements, and means for turning said cam.

18. A device as set forth in claim 13 wherein the holder has similar lens elements mounted symmetrically at each side of its axis, means for slightly turning said holder to shift said lens elements relatively sidewise with respect to the frames on the film, a lens supporting member bearing one of said lens elements and mounted in said holder for movement in a direction toward and away from the axis about which said holder turns, walls defining a cam slot in said holder, and a cam mounted in such support for movement in said cam slot to move said holder for focusing the lenses therein.

WILLIAM M. THOMAS.